United States Patent [19]
Barrette, Jr. et al.

[11] 3,816,876
[45] June 18, 1974

[54] FISH PROCESSING MACHINE
[76] Inventors: Oliver T. Barrette, Jr., 122 Jefferson St.; Lucien W. Carignan, 130 Pilgrim Pky., Apt. No. 7, both of Warwick, R.I. 02888
[22] Filed: July 12, 1972
[21] Appl. No.: 270,939

[52] U.S. Cl. .................................. 17/57, 17/52
[51] Int. Cl. ............................................. A22c 25/16
[58] Field of Search .................. 17/56, 57, 61, 52

[56] References Cited
UNITED STATES PATENTS
2,913,759  11/1959  Euich ................................... 17/61
3,570,048  3/1971  Michael ................................ 17/56

Primary Examiner—Antonio F. Guida
Assistant Examiner—D. L. Weinhold
Attorney, Agent, or Firm—Barlow & Barlow

[57] ABSTRACT

A fish processing machine having a stand, a rotary knife unit, a support unit for the rotary knife unit, having its one end pivotally attached to the top of said stand, and a conveyor tray unit having elongated trays positionably supported by the stand beneath the rotary knife unit. The elongated trays have a concave curvature in their upper surface to accept the curvature of the fish and the curvature of the rotary knife. At the forward end of the machine a pivotal clamp member extends over a portion of the elongated trays and it is automatically actuated to clamp the head of the fish securely to the tray during the cutting operation. The rotary knife unit comprises a rotary knife connected to a motor that intermittently rotates the knife first in the clockwise direction and then in the counterclockwise direction. A first air cylinder motor unit mounted on the stand is connected to the rotary knife support unit and it functions to raise and lower the rotary knife respectively from and toward the elongated trays. A second air cylinder motor unit is mounted on the rotary knife support unit with its piston rod connected to structure supporting the rotary knife such that its stroke back and forth causes the rotary knife to traverse the longitudinal axis of the tray. The conveyor tray unit comprises a plurality of elongated trays with the drive shaft for the conveyor being mechanically connected to a rotary motor that indexes the trays sequentially into position beneath the rotary knife.

9 Claims, 5 Drawing Figures

3,816,876

FISH PROCESSING MACHINE

BACKGROUND OF THE INVENTION

This invention relates to a fish processing machine that is used to remove the fillet portion from the fish. The particular type of fish that this machine has been designed to process are the species known as poggies, blowfish or toads such as found along the salt water areas of The Atlantic Coast. It is to be realized, however, that applicants' fish processing machine could be used with other species of fish having similar physical characteristics.

These poggies are normally 12 inches or less in length and they are caught for their fillet portion which has a commercial value. In the past these fish were always filleted manually by hand at a relatively slow rate. Due to their very tough skin which is like sandpaper, the workers developed bloodied hands and sore wrists during a normal day's work. Even attempts to use gloves while cleaning these fish have proven unsuccessful as the life of the gloves lasts less than an hour during steady work. Due to the characteristics of the work, it is frequently difficult to obtain workers to do this filleting job. A good worker's production would run about five per minute but this work load could not be carried out over the normal period of a work day.

SUMMARY OF THE INVENTION

Applicants' novel fish processing machine has been designed to greatly increase the number of fish that may be processed during a normal work day and where a single spindle machine is used an increase of approximately four times the production obtainable from a manual worker is obtained. Applicants' machine can also be assembled with multiple spindles where each spindle has its own rotary knife, thus producing even greater production. Eliminated by this machine are all workers' raw and bloodied hands that resulted from cleaning the fish along with the sore wrists resulting from the strain of holding the fish during the fish skinning operation. Produced is an automatic skinning and filleting machine capable of greatly multiplying productive output.

The operation of applicants' machine processing the fish begins as the fish is placed on one of the tray units of the conveyor tray unit. Next that the tray is automatically indexed forward to a position beneath the rotary knife. A pivotal clamp member extending out over the head of the fish is automatically actuated to clamp the head of the fish firmly against the tray. Sequentially the rotary knife unit is pivotally lowered toward the area of the fish immediately to the rear of the head with rotational motion given to the rotary knife so that as it continues downward to a point approximately 1/4 of an inch above the top of the tray surface, the initial cut into the fish is made. The rotary knife unit is then given movement which carries it along the longitudinal axis of the tray and the fish there on it. During this period of travel the rotary knife is given a rotative motion first in one direction and then a rotative motion in the opposite direction with there being two reciprocations per second. Since the time for the rotary knife unit to travel the length of the fish is approximately four seconds a zigzag pattern is produced along the skin of the fish where it has been cut and torn during this longitudinal feed. While the feed is being accomplished that cuts the fish's skin, the fillet portion of the fish with the vertebrae still therein is caused to be peeled upwardly from the body of the fish during the longitudinal path. At the end of this troke the fillet then separated from the body of the fish would be deposited on a carrier tray or conveyor tray positioned near the tip of the tray. At this point the rotary knife unit would be pivoted upwardly and given a reciprocal motion carrying it back to its initial position at the start of the cycle. At the same time the pivotal clamp member would release the head portion of the fish and the indexing motor of the conveyor unit would transport the processed fish away and position a new fish to be processed beneath the rotary knife unit. This would complete the cycle of the machine through which each fish would be processed.

It is an object of applicants' fish processing machine to eliminate the physical abuse workers hands receive in filleting fish.

It is also an object of applicants' fish processing machine to mechanize the operations of filleting fish that are presently accomplished manually.

It is a further object of applicants' fish processing machine to greatly increase production in the processing of fish and to accomplish this at a greatly reduced cost.

DESCRIPTION OF THE PREFERRED EMBODIMENT

Figure 1:
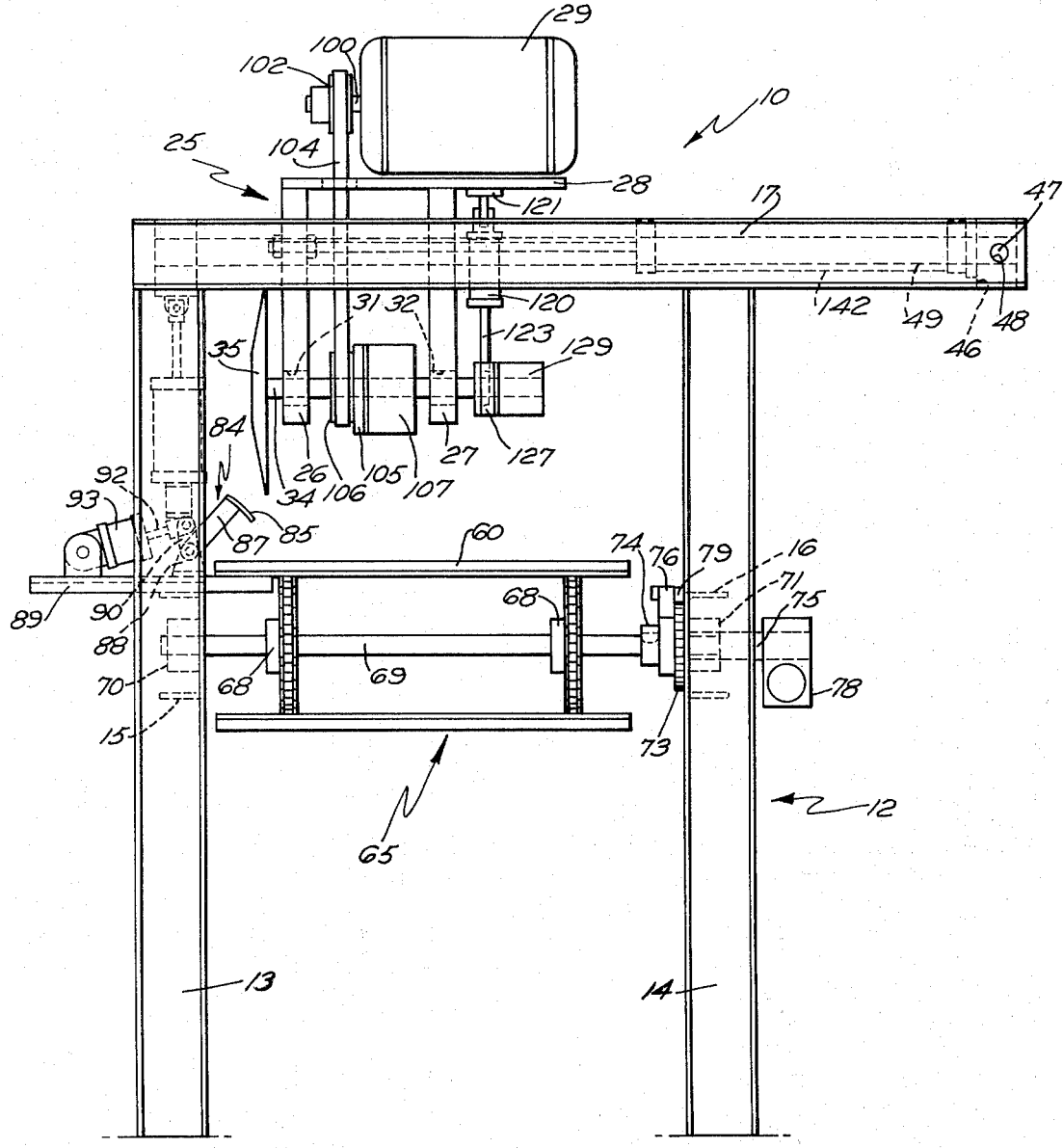
FIG. 1 is a side elevation view of applicants' novel fish processing machine.
Figure 2:
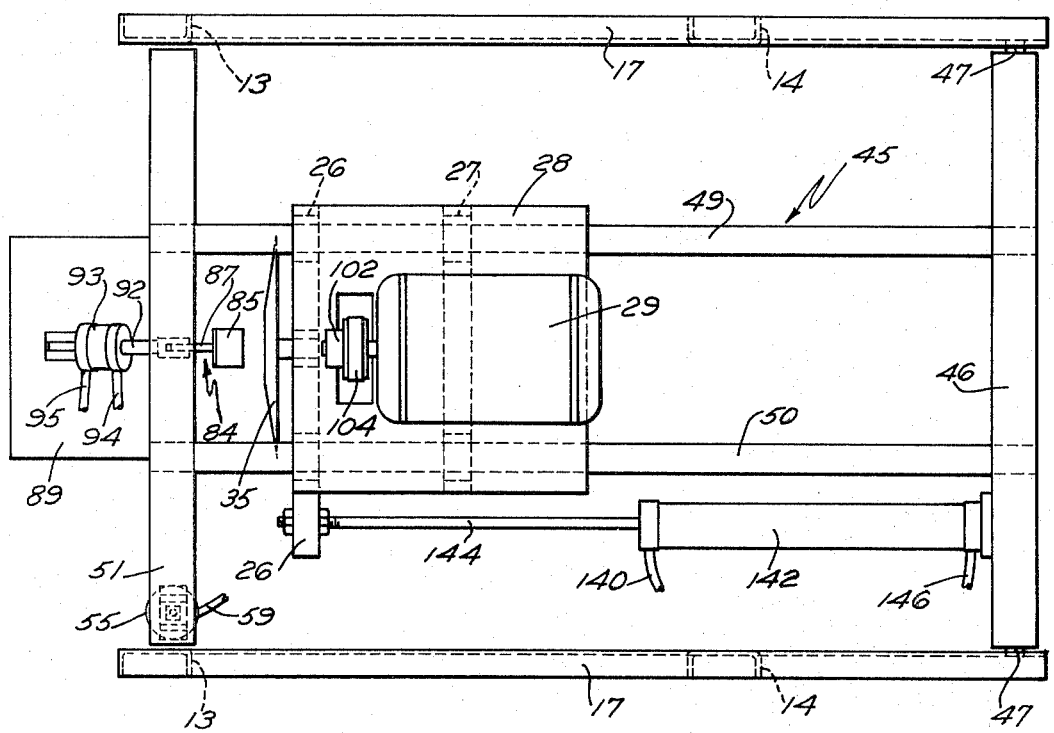
FIG. 2 is a top plan view of the fish processing machine having the conveyor tray unit removed for clarity.
Figure 3:
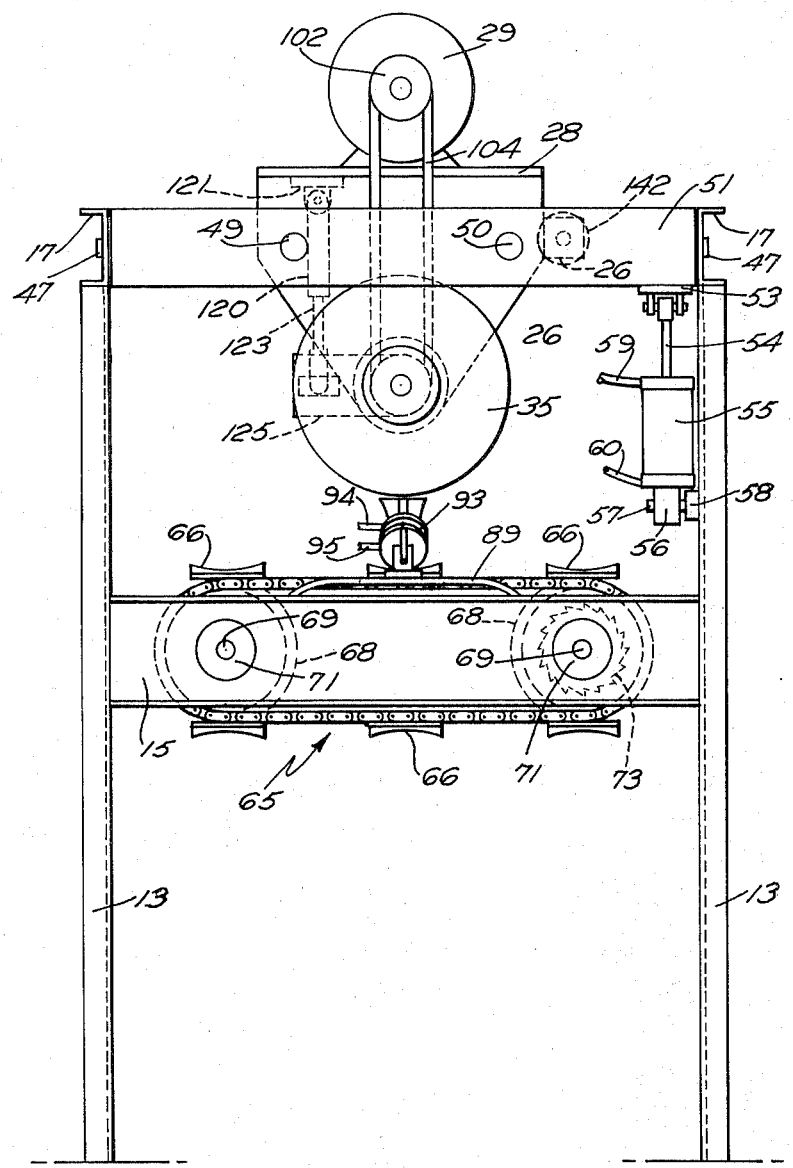
FIG. 3 is a front end view of the fish processing machine.

Referring to FIGS. 1 thru 3 the operation of applicants' novel fish processing machine will now be described. The machine itself is generally designated by numeral 10 and is comprised of support stand or base 12, rotary knife unit 25, rotary knife support unit 45, and conveyor tray unit 65.

Support stand 12 has two front vertical support members 13 and two rear support vertical members 14. The front vertical support members are tied together intermediate their lengths length by cross brace 15 and the rear vertical support members are tied together intermediate their lengths by cross brace 16. Connecting the tops of support members 13 and 14 are cross members 17 to form a rigid frame for the support stand.

The rotary knife support unit 45 is pivotally attached to support stand 12 between cross members 17. The support unit has a cross member 46 with trunnions 47 on its opposite ends that are pivotally secured in bores 48 of cross member 17. Attached perpendicular to cross member 46 are a pair of track rods 49 and 50 whose opposite ends have a cross brace 51 secured perpendicular to them. The track rods provide a guide to control the alignment of the rotary knife unit 25 as it passes over the fish. More specifically the track rods pass through aligned apertures in vertical support plates 26 and 27. The vertical support plates are laterally spaced and have a platform 28 mounted on their top surface which supports motor 29. Additionally the vertical support plates have bores 31 and 32 respectively through which passes spindle 34 upon which rotary knife 35 is mounted. The manner in which the rotary knife 35 is controlled during the cutting operations so that it rotates in first one direction and then in the other direction will be discussed later.

The structure which lowers the rotary knife 35 into its cutting position is best illustrated in FIG. 3. Attached to the underside of the cross brace 51 is bracket 53 which is pivotally attached to the tip of piston rod 54. The piston rod is attached to a piston within air cylinder motor 55 with the bottom of the air cylinder having a bracket 56 mounted which receives pin 57 of bracket 58 which in turn is mounted on vertical member 13. It will be quickly understood that as air is directed into air tube 59 the piston rod will be retracted thus pivoting the rotary knife support unit 45 down about trunnions 47 to carry the rotary knife into its cutting position. Likewise when air is directed into air tube 60 piston rod 54 will be directed upwardly thus raising rotary knife unit 25 to its initial position.

Conveyor tray unit 65 and its operation will be best understood by referring to FIGS. 1 and 3. In order to continuously maintain a steady supply of fish to the processing area, a plurality of trays 66 are mounted on laterally spaced chains 67. These chains pass around sprocket gears 68 which are also laterally spaced and which are keyed to shaft 69. The opposite ends of shaft 69 are secured in bearings 70 and 71 which are mounted in vertical members 13 and 14 respectively. Also mounted on one of the shafts 69 is a ratchet gear 73 secured to the shaft by key 74. Laterally positioned across cross brace member 16 a second shaft 75 passes therethrough and has a pawl mount 76 keyed on one end and a rotary motor 78 for indexing the conveyor unit mounted on the other end of the shaft. As this rotary motor 78 is operated, pawl mount 76 is rotated causing pawl 79 which is engaged with ratchet gear 73 to rotate shaft 69. Rotary motor 78 would be operated sequentially only for the time period when it is necessary to index the next successive tray on which a fish had been loaded into the cutting position.

During the fish filleting operation each tray 66 that is loaded with a fish is successively brought into position beneath the rotary knife. As this happens the head 85 of pivotal clamp member 84 is caused to automatically pivot down against the head of the fish to fixedly secure it against the bottom of tray 66. Pivotal clamp member 84 has its arm portion 87 pivotally secured to bracket 88 that is mounted on horizontal platform 89. Also pivotally attached to bracket 88 is one end of link bar 90 whose opposite end is pivotally attached to a bracket mounted on the end of piston rod 92. The piston rod is actuated in response to air being introduced into air cylinder motor 93 through air tube 95 which would cause the head of the clamp member to be moved into contact with the head of the fish. When air is directed through air tube 94, the head of clamp member 84 would be withdrawn from the head of the fish.

The manner in which the fish to be processed is automatically conveyed into the position beneath the rotary knife has been detailed, as has been the manner for clampingly holding the head of the fish when it reaches that position. Also earlier description indicates how the rotary knife unit is both raised and lowered in and out of the cutting area. The actual cutting operation will now be discussed with particular attention being directed to FIGS. 4 and 5. As the rotary knife unit is initially brought down to the cutting area, motor 29 is rotating shaft 100 upon which sheave 102 is mounted. Belt 104 passes around sheave 102 and also sheave 106 that freely rotates on spindle 34. Sheave 106 forms part of clutch 105 which may be electro-mechanical as is well known and a switch (not shown) at a predetermined time is closed to activate clutch plate 107 which is keyed to spindle 34 is caused to engage the clutch plate 106 giving a rotational motion to rotary knife 35. While this is happening the rotary knife is lowered to its lowermost position causing it to cut through the fish at a position just to the rear of the head of the fish and down to within approximately 1/4 of an inch of the tray 66. When the rotary knife 35 has reached its lowermost position the previously mentioned switch is opened and clutch 107 is automatically disengaged and the mechanism which gives oscillating rotational motion to the rotary knife is activated by the closing of a second switch (not shown). This secondary unit consists of an air cylinder motor 120 having its top end secured by hinge bracket 121 to the underside of platform 28. Its piston rod 123 has a bracket secured on its end which is fixed to arm 125 that extends radially horizontal to shaft 34 upon which it is freely rotatable. This arm 125 has clutch plate 127 secured to its end which passes over the shaft spindle. Fixedly keyed to shaft 34 is clutch plate 129 which when actuated by said second mentioned switch causes plates 127 and 129 to engage and provides the drive to give rotary knife 35 its oscillating rotary motion as air is pumped first into one end of air motor 120 and then into the other end of the motor. All the while this is taking place air is being directed into tube 140 of air cylinder 142 thus causing piston rod 144 to retract along an axis parallel to that of the longitudinal axis of the tray members. Since piston rod 144 is secured to vertical support plate 26 the whole rotary knife unit is caused to travel along this same path along the top of the fish as it cuts it. When piston rod 144 reaches the end of its stroke air is directed into tube 146 which will cause the rotary knife unit to be carried back to its initial forward position once more. It has also been found that where increased air pressure is used in operating air cylinder motor 120, rotary knife 35 can be rotated with sufficient speed to cut through the bones of the fish just to the rear of its head. This effectively would allow motor 29 and all its belt drive to be eliminated from the structure of the machine. Additionally both clutch mechanisms could be eliminated by using a direct drive from air cylinder motor 120 to spindle 34. This could be done by fixedly keying member 127 directly to spindle 34 instead of allowing spindle 34 to rotate freely with respect to member 127 as it is illustrated.

Figure 4:
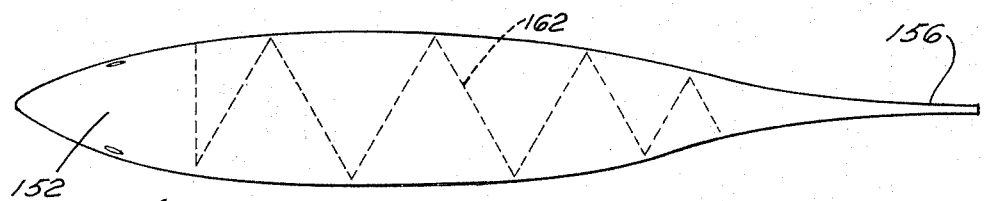
FIG. 4 is a partial elevation view illustrating how the rotary knife cuts the skin of the fish and peels the fillet portion away from the body.
Figure 5:
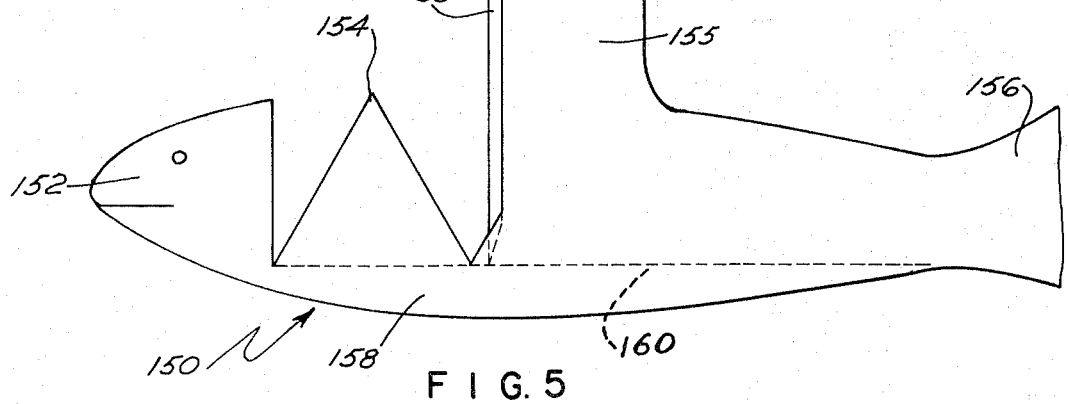
FIG. 5 is a top plan view of a fish being processed illustrating how the skin of the fish is cut.

The combination of an oscillating rotational movement of rotary knife 35 as it traverses the longitudinal axis of a fish 150 results in the skin of the fish being severed along a line 162 such as seen in FIG. 4. In FIG. 5, the rotary knife is illustrated as having passed partly along the length of the fish and it will be seen that the initial cut of the rotary knife has been made immediately to the rear of the head 152 and that the knife has traveled part way along the length of the fish. As it travels it has cut or torn the skin 154 of the fish in the manner described previously causing the fillet portion 155 of the fish to be lifted upwardly and ride along the front of knife 35 in much the manner as seen in FIG. 5. The lower extremity of rotary knife 35 travels along path 160 to the tail 156 of the fish with its path traveling above the internal organs 158 of the fish as it peels off the fillet portion 155.

What is claimed is:

1. A fish processing machine comprising
a stand,
a track on said stand,
a carriage on said track,
rotary knife supportably mounted on said carriage,
means for rotating said knife,
tray means having at least one elongated tray and having the
functional purpose of supportably holding a fish longitudinally of the tray with its lengthwise extent laterally of the plane of the rotary knife while it is being processed,
means for lowering said rotary knife toward said elongated tray, means to move said carriage along said track to vary the relative position of said rotary knife with respect to said tray along the longitudinal axis of said tray whereby a fillet is removed from the fish.

2. A fish processing machine as recited in claim 1 wherein said means for rotating said knife comprises means for reversing the direction of rotation of said rotary knife.

3. A fish processing machine as recited in claim 1 wherein the knife is curved out of a single plane and the top of said tray has a concave curvature thereby allowing it to somewhat conform to the curvature of the fish and most especially to the curvature of the rotary knife.

4. A fish processing machine as recited in claim 1 wherein said tray comprises part of a conveyor tray unit.

5. A fish processing machine as recited in claim 4 wherein there are a plurality of trays mounted on said conveyor tray unit.

6. A fish processing machine as recited in claim 5 further comprising indexing means for sequentially positioning each successive tray into position beneath the rotary knife.

7. A fish processing machine as recited in claim 1 wherein said means for lowering said rotary knife comprises a support unit having one of its ends pivotally attached to said stand with means connected to the free end of the unit to lower and raise it.

8. A fish processing machine as recited in claim 1 further comprising clamp means to hold a fish placed on said tray in position.

9. A fish processing machine as recited in claim 8 wherein said clamp means comprises an arm member pivotally mounted at one end and having a clamping head at its other end.

* * * * *